(12) United States Patent
Abdelhadi

(10) Patent No.: US 7,158,048 B2
(45) Date of Patent: Jan. 2, 2007

(54) IDENTICALLY PROGRAMMED INTELLIGENT ELECTRODES FOR USE IN GEOELECTRICAL SURVEYS

(75) Inventor: Abderrahim Abdelhadi, North York (CA)

(73) Assignee: Scintrex Limited, Concord (CA)

( * ) Notice: Subject to any disclaimer, the term of this patent is extended or adjusted under 35 U.S.C. 154(b) by 361 days.

(21) Appl. No.: 10/681,932

(22) Filed: Oct. 9, 2003

(65) Prior Publication Data

US 2005/0078011 A1 Apr. 14, 2005

(51) Int. Cl.
*G01V 3/00* (2006.01)
*G02J 13/00* (2006.01)
*G01V 1/00* (2006.01)
*G06F 19/00* (2006.01)
*H03K 17/00* (2006.01)

(52) U.S. Cl. .............................. 340/854.9; 340/825.52; 340/854.7; 340/854.8; 340/855.3; 340/855.1; 702/6; 702/7; 702/65

(58) Field of Classification Search .................... 702/6, 702/7, 65; 340/854.9
See application file for complete search history.

(56) References Cited

U.S. PATENT DOCUMENTS 3,851,302 A * 11/1974 Schmitt ........................ 367/79

(Continued)

OTHER PUBLICATIONS

Gish, O.H. and W.J. Rooney, Measurement of Resistivity of Large Masses of Undisturbed Earth, *Terrestrial Magnetism and Atmospheric Electricity*,-vol. 30, No. 4, pp. 161-188, 1925.

(Continued)

*Primary Examiner*—Jeffery Hofsass
*Assistant Examiner*—Sisay Yacob
(74) *Attorney, Agent, or Firm*—Fay, Sharpe, Fagan, Minnich & McKee, LLP

(57) ABSTRACT

Apparatus for conducting geophysical surveys comprising a multiplicity of intelligent electrodes provided on a multi-conductor cable, for receiving a command signal in response to which predetermined electrodes are connected to selected conductors in the cable. Each intelligent electrode is identical in all respects, including its programming, resulting in simplified construction of the cable and easy replacement of the intelligent electrodes. Instead of assigning a unique address code to each switch in a series of take-outs on a multi-conductor cable, each electronic switch is programmed with the same address code. That is, each switch is programmed to be activated when it receives a code command that, for example, is prefaced with a particular address, e.g. the number 1. The second part of the code (y) instructs the switch as to which conductor in the multi-conductor cable is to be connected to the local electrode at the location of the switch. When the controller issues a code command that is prefaced by a number which is larger than 1, (e.g. n), then the first switch in the sequence of switches along the cable decrements the preface number. The first switch then re-transmits the code command, with only the preface portion having been changed, (i.e. to n−1), along the cable to the next switch in the series. Each successive switch performs a similar modification to the preface number, and retransmits the progressively modified code command to the next switch in the series. Ultimately, when the modified command reaches the nth switch, it is prefaced with the number 1, whereupon that switch then recognizes it as a valid command to operate. The second part of the command (y) remains unaltered through the repeated re-transmissions, and determines which conductor in the cable is to be connected to the electrode (i.e. to ground).

13 Claims, 3 Drawing Sheets

U.S. PATENT DOCUMENTS

| | | | |
|---|---|---|---|
| 4,752,881 A * | 6/1988 | Griffiths et al. | 702/7 |
| 6,404,203 B1 | 6/2002 | Lagmanson | |
| 6,907,363 B1 * | 6/2005 | Wyant et al. | 702/65 |
| 6,943,553 B1 * | 9/2005 | Zimmermann et al. | 324/357 |
| 2004/0222805 A1 * | 11/2004 | Tillmann et al. | 324/715 |

OTHER PUBLICATIONS

Seigel, H.O., Mathematical Formulation and Type Curves for Induced Polarization, *Geophysics*, vol. 24, pp. 547-563, 1959.

* cited by examiner

IDENTICALLY PROGRAMMED INTELLIGENT ELECTRODES FOR USE IN GEOELECTRICAL SURVEYS

FIELD OF THE INVENTION

This invention relates in general to geoelectrical surveys, and more particularly to an improved method and apparatus for making ground contacts in conducting resistivity and induced polarization surveys.

BACKGROUND OF THE INVENTION

Measurement of the electrical resistivity of the earth is one of the most venerable geophysical methods (e.g. see Gish, O. H., and Rooney, W. J, "Measurements of large masses of undisturbed earth", Terrestrial Magnetism, Vol. 30, No. 4, pp 161–188, 1925). Such measurements of resistivity are commonly made by passing electrical current of a selected waveform between two ground contact points, referred to as "current electrodes" and measuring the resultant voltages between two other ground contact points, referred to as "potential electrodes". The geometrical disposition of the four electrodes, termed the "array", may vary, depending on local circumstances and preferences of the survey operator. These arrays may be known by the names of their initial users, such as Schlumberger, Wenner, or by their description, such as "dipole-dipole", or "pole-dipole", etc.

Somewhat more recently, measurements of the induced polarization characteristics of the earth have been made using similar electrode arrays (e.g. see Seigel, H. O. "Mathematical formulation and type curves for induced polarization", Geophysics Vol. 24, pp 547–563, 1959). There are other geoelectrical methods as well, all of which require making ground contact at multitudinous locations.

Typically, a large suite of such measurements are made, in a systematic fashion, over the area of interest, so that a map may be drawn up showing the distribution of the resistivity and/or induced polarisation characteristics, etc., over the surface of the survey area. Depending on the specific instrumentation employed, either single sequential measurements of these electrical properties may be made or, more efficiently, multiple concurrent measurements may be made, using multiple measuring circuits and multi-conductor cables.

To facilitate the making of a large number of measurements, either sequential or concurrent, it is common practice to use multi-conductor cables, each with a series of ground contact points (or take-outs), at intervals along the cable. For each individual measurement a selection of ground contact points has to be made, namely two for passing current into the ground (current electrodes) and two for measuring the resultant ground voltages (potential electrodes). Older instruments employed for this purpose utilized cables with as many conductors as there were take-outs, and with all of the conductors terminating at a switch box of an electronic console, at the position of the survey operator. In such instruments the operator carried out the selection of electrodes to be employed for a specific reading, either manually, or through software, at the switch box.

In order to reduce the number of individual conductors in the field cables, software controlled switches have been introduced at each take-out point along the cable. These switches are programmed for connecting the desired electrodes to either the desired current conductors or the desired potential (measuring) conductors, based on multiple software addresses. For example, U.S. Pat. No. 6,404,203, (M. S. B. Langmanson), discloses software-controlled contacts for creating the desired array geometry. This approach to software-controlled selective switching of electrodes in multi-electrode cables is utilized, for example, in the SARIS™, automated resistivity system of Scintrex, Limited, Concord Ontario, and in the Super-Sting™ resistivity instrument of Advanced Geoscience, Inc., Austin, Tex.

Typically, in these devices, each of the software-controlled take-outs has its own address code, and is activated to connect it to the local ground point (electrode) when it receives its address code, transmitted down the cable. The use of an address code, that is unique to each take-out position on the cable, facilitates efficiency in the coverage of large areas, but it has certain shortcomings as well. For example, when two sections of multi-take-out cables are connected together, for the so-called "roll-along" technique, special software is required to recognize that a take-out in the second cable is desired to be switched rather than a take-out at the identical position in the first cable. In addition, if one electrode switch becomes faulty, it must be replaced with one that has the identical address as the faulty switch, which makes the replacement more difficult.

It is a purpose of this invention to provide intelligent take-outs to ground that are, in all respects, identical, including their software code address, so that each electronic switch may act as a replacement for any faulty switch, regardless of its position along the cable. It is another purpose of this invention to provide an electronic switch that may be addressed from either end of the cable on which it lies, so that each cable may function equally well when oriented in either direction along a survey line.

SUMMARY OF THE INVENTION

According to the present invention, a multiplicity of intelligent electrodes is provided on a multi-conductor cable, for receiving a command signal, in response to which predetermined electrodes are connected to selected conductors in the cable. Each intelligent electrode is identical in all respects, including its programming, resulting in simplified construction of the cable and easy replacement of the intelligent electrodes.

Instead of assigning a unique address code to each switch in a series of take-outs on a multi-conductor cable, each electronic switch is programmed with the same address code. That is, each switch is programmed to be activated when it receives a code command that, for example, is prefaced with a particular address, e.g. the number 1. The second part of the code (y) instructs the switch as to which conductor in the multi-conductor cable is to be connected to the local electrode at the location of the switch. When the controller issues a code command that is prefaced by a number which is larger than 1, (e.g. n), then the first switch in the sequence of switches along the cable decrements the preface number. The first switch then re-transmits the code command, with only the preface portion having been changed, (i.e. to n−1), along the cable to the next switch in the series. Each successive switch performs a similar modification to the preface number, and retransmits the progressively modified code command to the next switch in the series. Ultimately, when the modified command reaches the nth switch, it is prefaced with the number 1, whereupon that switch then recognizes it as a valid command to operate. The second part of the command (y) remains unaltered through the repeated re-transmissions, and determines which conductor in the cable is to be connected to the electrode (i.e. to ground).

In this fashion, any defective switch may be replaced by any spare switch, without the need for special programming of the replacement switch. In addition, any desired number of switches may be placed in tandem along a cable, and any number of cables may be linked, in sequence, without any concern about modification of the operating software. This feature facilitates the surveying of long lines, in the so-called "roll-along" procedure.

In another aspect of this invention, each switch is addressable by a command from either direction along the cable. This ability enables cables to function in a bidirectional fashion, to the benefit of surveying efficiency.

BRIEF DESCRIPTION OF THE DRAWINGS

A detailed description of the preferred and alternative embodiments of the invention is set forth below, with reference to the following drawings, in which.

DESCRIPTION OF ILLUSTRATIVE EMBODIMENTS

Figure 1:
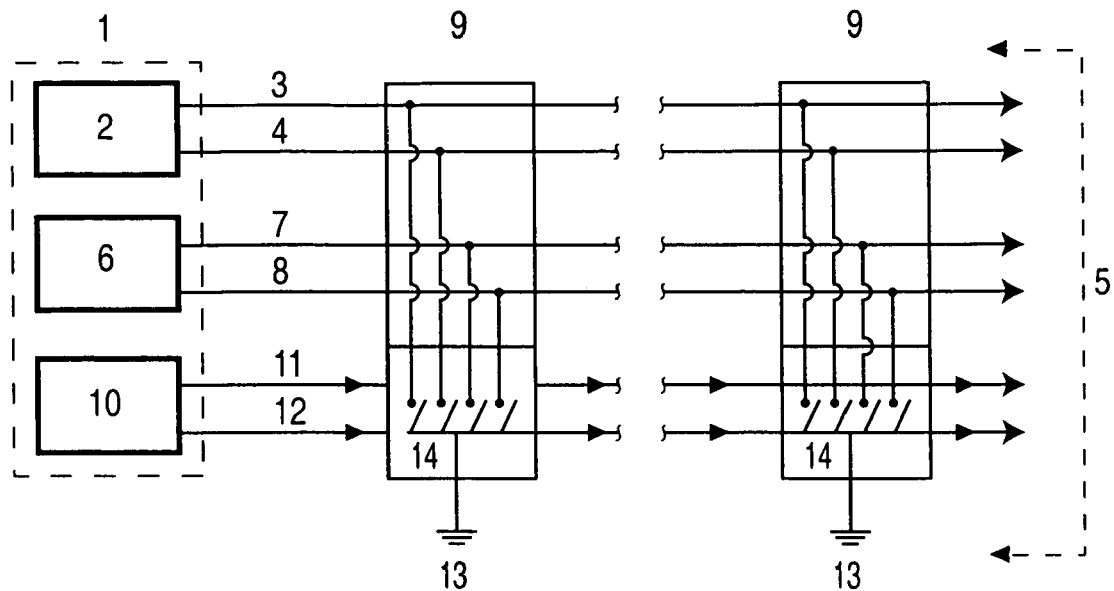
FIG. 1 is a schematic diagram showing an apparatus, according to an embodiment of the present invention, in its broadest aspect, for measuring electrical properties of the earth.

In FIG. 1, reference character (1) denotes an apparatus for measuring electrical properties of the earth, including a generator (2) of electrical current having a predetermined waveform (commonly either a low frequency alternating, or direct current). The output of the generator (2) is connected across two conductors (3) and (4) in a multi-conductor cable (5). An electronic voltmeter (6) has an input connected to two further conductors (7) and (8) in the cable (5).

Along the cable (5), a series of electronic switching circuits (9) are located at selected intervals, commonly, but not invariably, at uniform distances, (e.g. 10 m, 25m, or 50 m along the cable). There may be as many such electronic switching circuits (9) as desired along the cable (5), depending on the length of the cable and the interval between the switches. As will be described below, these circuits can be programmed, through coded software commands from a controller (10) in the apparatus (1). The command signals are transmitted along a third pair of conductors (11) and (12) in cable (5), so as to connect any desired combination of conductors (3), (4), (7) and (8) to ground through electrodes (13) at the switch locations. The coded command signals identify which of the switching circuits are to be activated for that measurement, and which conductors (3), (4), (7) or (8) are to be grounded, by the individual switches (14), to electrodes (13).

Figure 2:
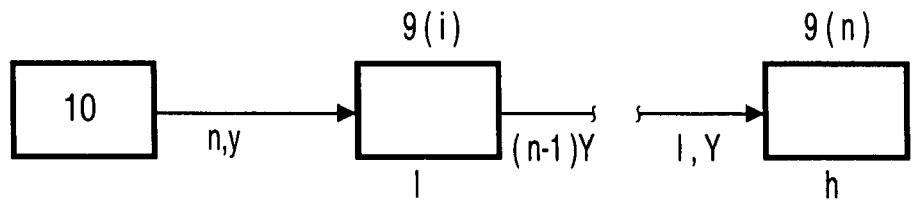
FIG. 2 is a flow chart showing a method, according to one embodiment of the present invention, for measuring electrical properties of the earth.

FIG. 2 is a schematic flow chart illustrating how, by software command, a selection can be made of the specific electrode (13) that will be connected to a specific conductor (3, 4, 7, or 8). Controller (10) transmits (from left to right along the cable (5) in FIG. 2) a coded command containing two parts. The first of these parts pertains to the address of the electrode (13) to be selected as a ground, and the second part contains the information as to which of conductors (3, 4, 7, or 8) is to be grounded at that electrode. For illustration purposes only, the first (electrode selective) part of the coded command may represent the distance (measured in numbers of electrodes) from the controller (10). For example, if the electrode to be addressed is the nth electrode from the controller (10), then as the command passes to the right down the series of switching circuits (electrodes) on the cable, each such switching circuit (9) modifies the command by reducing the number of this address, and retransmits the modified command to the next electrode in the series, (e.g. with first address n−1, n−2, etc). When the command arrives at the nth electrode, its first address is "1". The switching circuit (9) of the nth electrode recognizes "1" as a command to be executed. The second component in the command (y) determines which of the conductors is to be switched to ground at that electrode.

Figure 3:
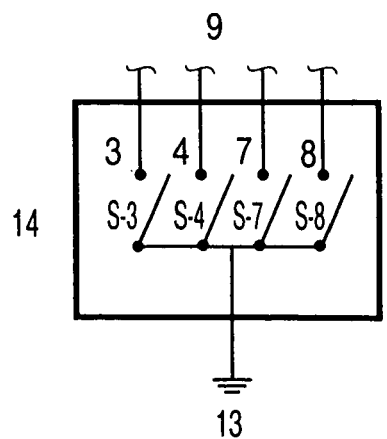
FIG. 3 is a schematic diagram showing, in more detail, the function of an electrode portion of the apparatus of FIG. 1.

FIG. 3 shows, in greater detail, a switching circuit (9) for selection of the conductor to be grounded. In each of the switching circuits (9) there are four individual switches (14) (labeled S3, S4, S7, and S8 in FIG. 3), one side of each of which is connected to the conductor of the same number. The other sides of all of the switches (14) are connected to ground at the local electrode (13). The second part of the software command (y) then determines which one of these four switches is closed for a particular measurement.

In this manner, it is possible to create a specific electrode array, (i.e. the desired combination of two electrodes to serve as current electrodes, for creating the electrical field in the earth, and two other electrodes serving as potential electrodes), to measure the resultant electrical voltages for each geoelectrical measurement.

Whereas the above embodiment illustrates the use of a single electronic voltmeter for measuring the voltages created in the earth by the passage of current from the generator (2), it is often advantageous to simultaneously measure a multiplicity of voltages, across different potential electrode pairs, by incorporating multiple voltmeters in the apparatus (1), each of which is connected to its own pair of conductors in the multi-conductor cable (5).

Figure 4:
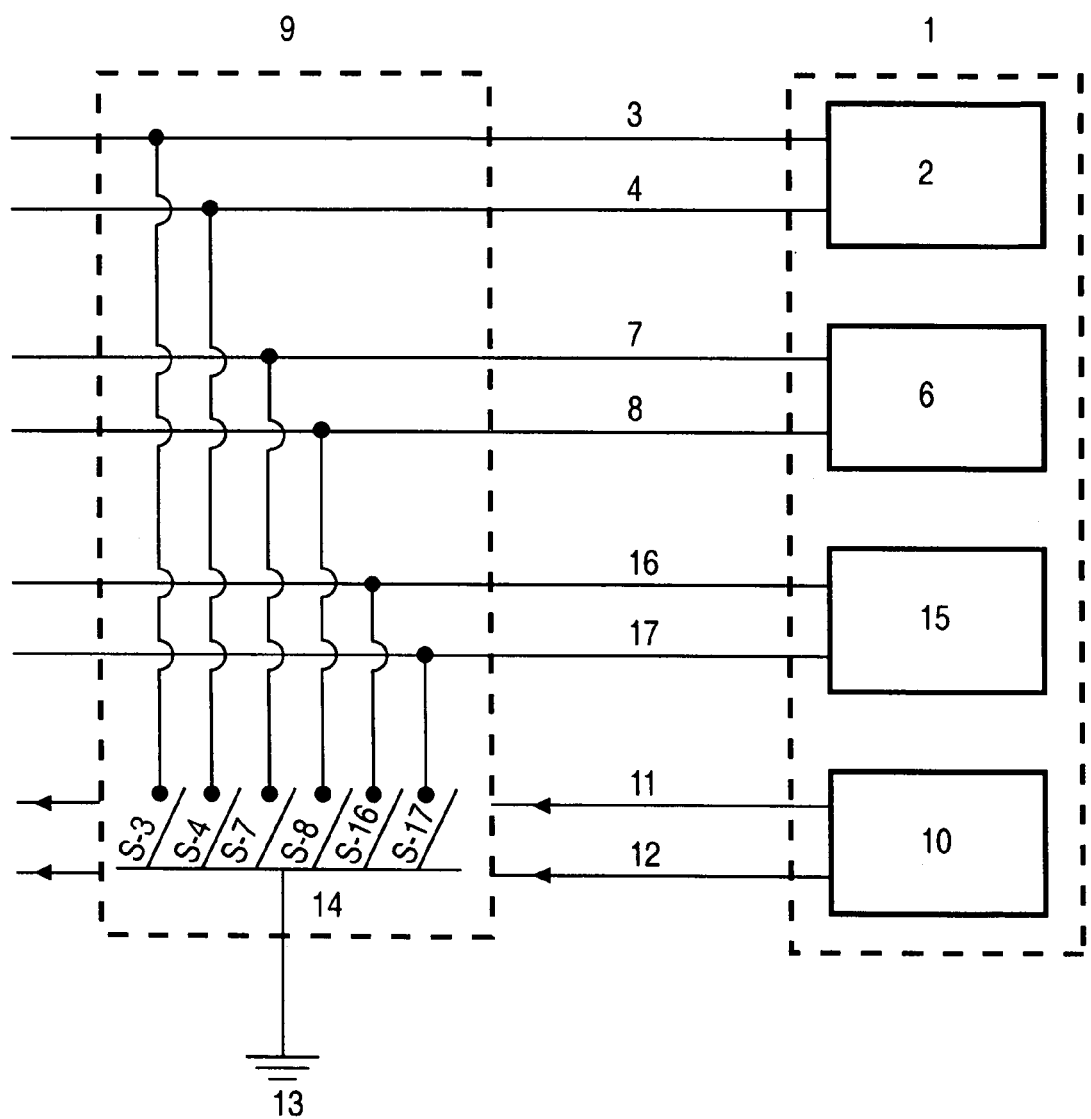
FIG. 4 is a schematic diagram showing a system according to an alternative embodiment of the invention.

FIG. 4 shows such an alternative embodiment, incorporating a second voltmeter (15) connected across two additional conductors (16) and (17). Each switching circuit (9) includes two additional software controlled switches S16 and S17 for connecting conductors (16) or (17) to ground, as and where required, to obtain a simultaneous second measurement of the electrical characteristics of the earth across a second dipole on the survey line.

Figure 5:
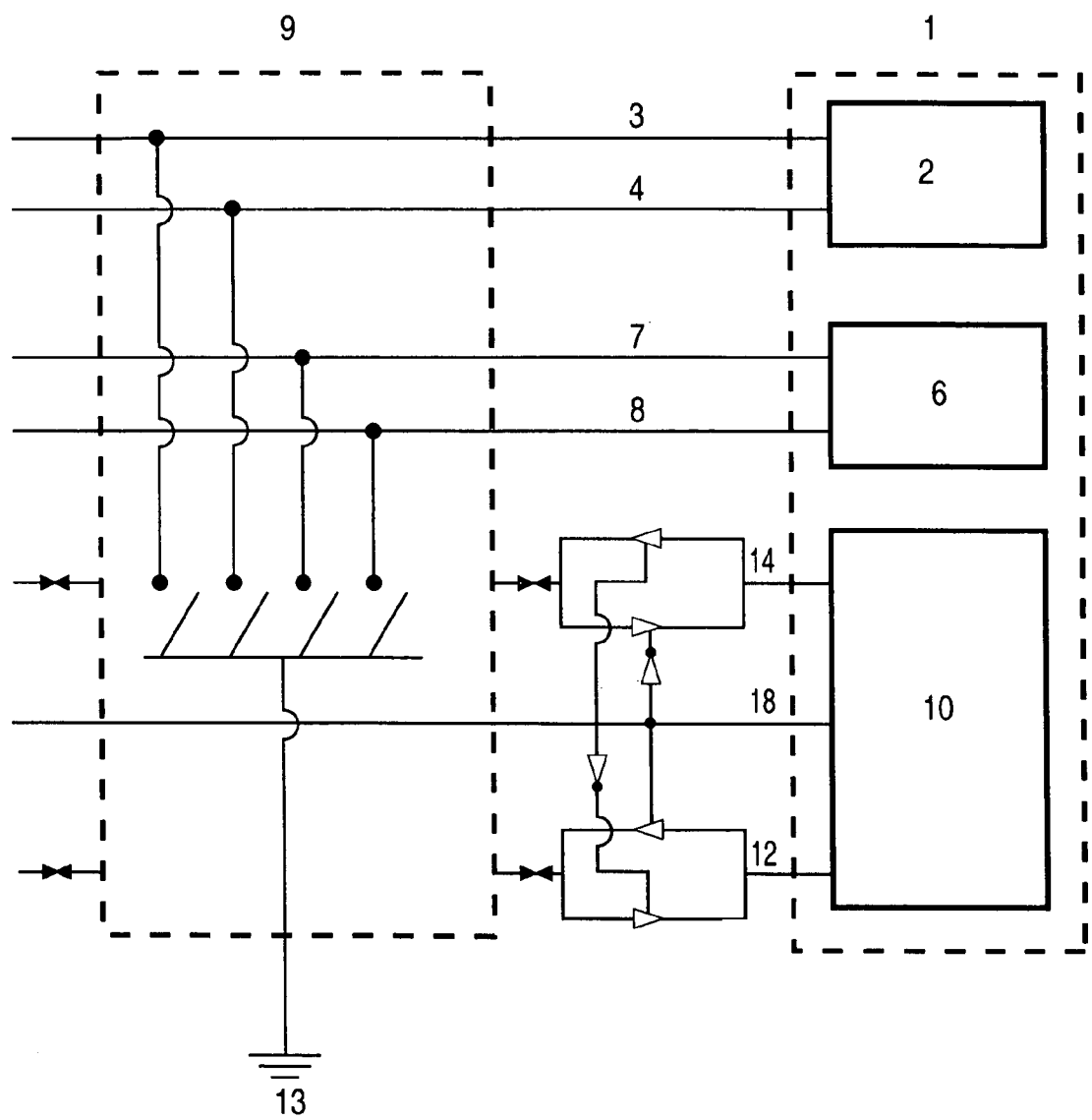
FIG. 5 is a schematic diagram showing a system according to a preferred embodiment of the invention.

FIG. 5 shows the preferred embodiment of the invention whereby the software switching circuits described above may be addressed from either direction along the cable. One additional conductor, (18) is installed in the cable (5). A command received from the other end (right to left in FIG. 5) of the cable controls the direction of the communications line, so that the modified commands are transmitted to successive sequential switching circuits, to the left, along the cable, rather than to the right as in FIGS. 1 and 2. In this manner, regardless of whether the controller (10) is located on the left or right end of the cable, the coded switching commands may be transmitted down the cable in a direction away from the controller.

Variations and modifications of the invention are contemplated. For example, rather than using "software" commands, electronic hardware may be utilized to generate the required command signal for transmission along the conductor. Also, rather than decrementing the address portion of the command code at each successive electrode, the code may be reduced by an amount other than one. Furthermore, although the preferred embodiment utilizes a two-part coded command, the command may contain more than two parts, in order to initiate additional electrode functions, etc. All such modifications and alternatives are believed to be within the sphere and scope of the present invention as defined by the claims appended hereto.

What is claimed is:

1. Apparatus for conducting geophysical surveys, comprising:
    at least one multi-conductor cable having a plurality of take-out locations;
    a controller transmitting a coded command signal having a first portion that is modifiable to identify a specific take-out location and a second portion identifying a specific conductor of said cable to be connected to ground at said specific take-out location; and
    a plurality of interchangeable addressable switches connected in series to said cable at selected ones of said take-out locations, each of said switches being operable to receive and modify the first portion of said command signal and to transmit the command signal so modified to an adjacent one of said switches, wherein upon receipt of a coded command signal, each said switch examines the first portion thereof to determine if said coded command signal is addressed thereto, if not, said switch modifying the first portion and transmitting the modified coded command signal to said adjacent switch and if so, said switch connecting said specific conductor to ground in accordance with said second portion of the coded command signal.

2. The apparatus of claim 1, further including a generator generating an electrical current on one conductor pair of said cable.

3. The apparatus of claim 1, further including a voltmeter measuring voltage across one conductor pair of said cable.

4. The apparatus of claim 1, wherein said controller generates said first portion of the coded command signal as a numeric corresponding in number to the position of a specific switch in said series along said cable measured from the location of said controller, and wherein the first portion of said command signal is modified to reduce said numeric by a predetermined amount at each successive one of said switches until the coded command signal is received by said specific switch, whereupon said specific switch connects said specific conductor to ground in accordance with said second portion of the coded command signal.

5. The apparatus of claim 4, wherein said predetermined amount is one.

6. The apparatus of claim 1, further including gate circuitry controlling the direction of transmission of said coded command signal along said cable, such that said controller may be selected for operation at either end of said cable.

7. The apparatus of claim 6, wherein said gate circuitry includes a pair of unidirectional gates connected in parallel with opposite polarity between respective ones of said switches for transmitting said coded command signal therebetween, and control logic connected to a further conductor of said cable and to each respective one of said gates for enabling only one of said gates in each pair, such that said coded command signal is transmitted between said switches in only one direction along said cable.

8. A method of conducting geophysical surveys along a multi-conductor cable having a plurality of take-out locations, comprising:
    transmitting from a controller a coded command signal having a first portion that is modifiable to identify a specific take-out location and a second portion for identifying a specific conductor of said cable to be connected to ground;
    connecting a plurality of interchangeable addressable switches in series to said cable at selected ones of said take-out locations; and
    within respective ones of said switches examining the first portion of a received coded command signal to determine if said coded command signal is addressed thereto, if not, modifying the first portion of said coded command signal and transmitting the modified coded command signal to an adjacent one of said switches and if so connecting, said specific conductor to ground in accordance with said second portion of the coded command signal.

9. The method of claim 8, further including generating an electrical current on one conductor pair of said cable.

10. The method of claim 8, further including measuring voltage across one conductor pair of said cable.

11. The method of claim 8, wherein said first portion of the coded command signal is a numeric corresponding in number to the position of a specific switch in said series along said cable measured from the location of said controller, and wherein the first portion of said command signal is modified to reduce said numeric by a predetermined amount at each successive one of said switches until the command signal is received by said specific switch whereupon said specific switch connects said specific conductor to ground in accordance with said second portion of the coded command signal.

12. The method of claim 11, wherein said predetermined amount is one.

13. The method of claim 8, further including controlling the direction of transmission of said coded command signal along said cable, such that said controller may selected for operation at either end of said cable.

* * * * *